United States Patent [19]
Marcott

[11] Patent Number: 5,520,262
[45] Date of Patent: May 28, 1996

[54] ELECTROHYDRAULIC STEERING SYSTEM

[75] Inventor: Tony L. Marcott, Plainfield, Ill.

[73] Assignee: Caterpillar Inc., Peoria, Ill.

[21] Appl. No.: 431,701

[22] Filed: Apr. 28, 1995

[51] Int. Cl.⁶ .................................................. B62D 5/09
[52] U.S. Cl. ........................... 180/418; 180/432; 60/444
[58] Field of Search ............................ 180/79, 132, 134, 180/152; 60/444; 91/461; 137/625.6

[56] References Cited

U.S. PATENT DOCUMENTS

| | | | |
|---|---|---|---|
| 3,439,768 | 4/1969 | Medley | 180/79.2 |
| 3,872,773 | 3/1975 | Denker | 91/461 X |
| 4,914,913 | 4/1990 | St. Germain et al. | 180/132 X |
| 5,020,618 | 6/1991 | Nagao | 180/132 |
| 5,249,639 | 10/1993 | Marr et al. | 180/133 |
| 5,267,628 | 12/1993 | Tomiyoshi et al. | 180/139 |
| 5,287,794 | 2/1994 | Andersson | 91/436 |

*Primary Examiner*—Margaret A. Focarino
*Assistant Examiner*—Victor E. Johnson
*Attorney, Agent, or Firm*—John W. Grant

[57] ABSTRACT

An electrohydraulic steering system has a three position pilot operated directional valve disposed between a variable displacement pump and a pair of steer cylinders. The directional valve controls the direction of fluid flow from the pump to the steer cylinders while the displacement of the variable displacement pump is controlled to vary the rate of fluid flow to the steer cylinders. The directional valve is moved to an on position in response to a pilot signal delivered thereto from a pilot valve device while the displacement setting of the variable displacement pump is varied by an electrical signal delivered to a displacement controller from a position sensor mechanism.

5 Claims, 1 Drawing Sheet

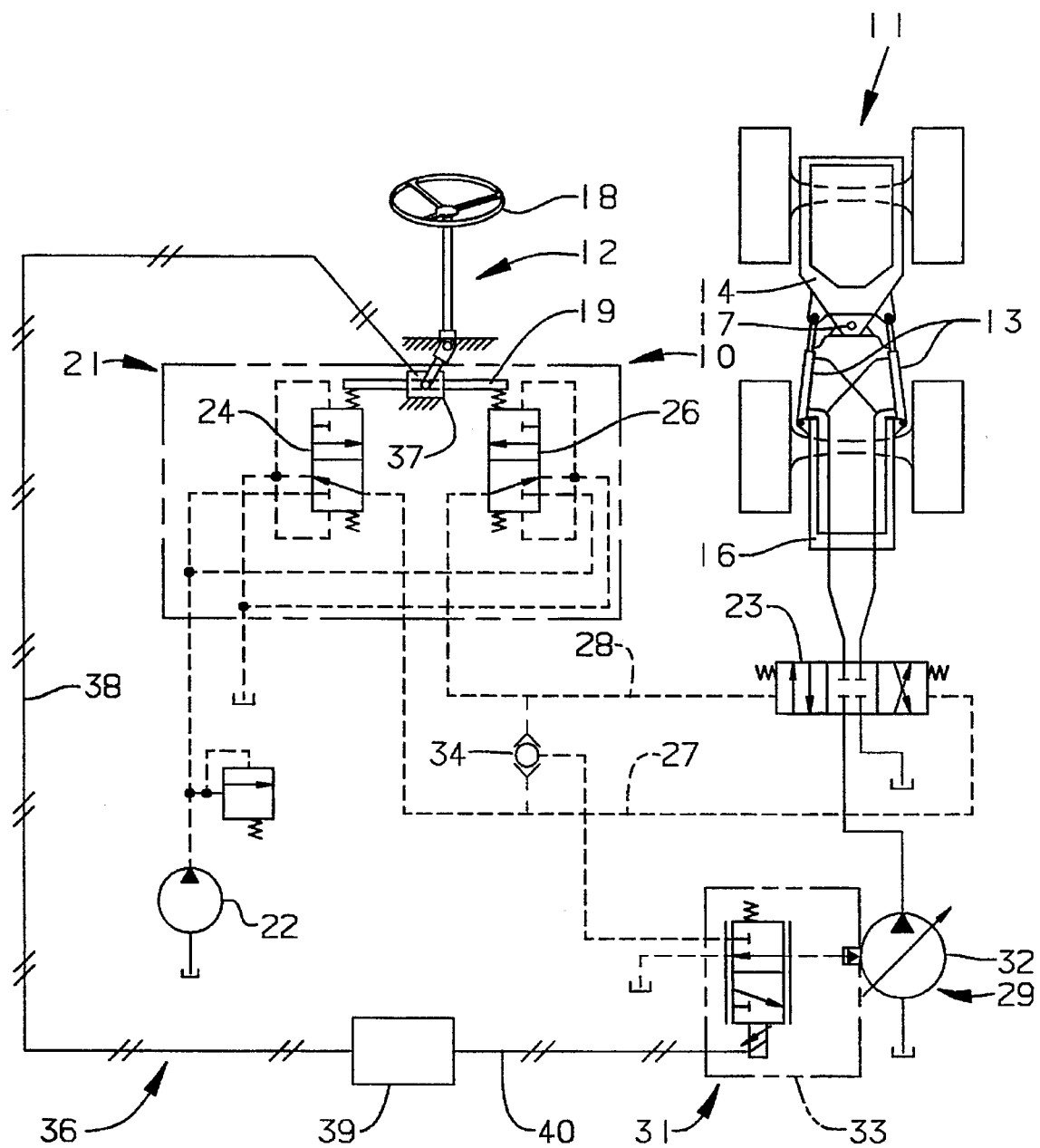

ELECTROHYDRAULIC STEERING SYSTEM

TECHNICAL FIELD

This invention relates to a steering system for a machine and, more particularly, to an electrohydraulic steering system which uses the pump to vary fluid flow rate to the hydraulic steer cylinders.

BACKGROUND ART

Most hydraulic steering systems for machines use a variable position control valve operatively connected to a steering wheel for varying flow rate of hydraulic fluid from a hydraulic pump to one or more hydraulic steer cylinders. The rate of fluid flow and thus the steering speed is proportional to the rotational position of the steering wheel. The steering control valve on some machines are closed center valves connected to a load sensing or load responsive hydraulic pump which automatically upstrokes to meet the demand for fluid when the steering control valve is opened to communicate the pump with the steer cylinders.

One of the problems with such systems is that changing the displacement of the pump tends to lag behind movement of the steering control valve to a steer position and generally either overshoots or undershoots the target flow rate established by the area opening of the steering control valve.

Thus it would be desirable to provide an electrohydraulic steering system having fast response to minimize lag time between the operator steer input command and actual steering of the machine and which minimizes overshoot and undershoot of the target flow rate established by the input command

DISCLOSURE OF THE INVENTION

In one aspect of the present invention, an electrohydraulic steering system is provided for a machine having a steer input mechanism responsive to an operator input command, and a hydraulic steer cylinder. The system includes a pilot operated directional valve connected to the hydraulic steer cylinder and movable in opposite directions from a flow blocking off position to first and second discrete fully open on positions. A pilot valve device is connected to a source of pressurized pilot fluid and to the directional valve and is operative to direct pilot fluid to the directional valve responsive to a steering input from the steer input mechanism. A source of variable volume pressurized fluid is connected to the directional valve and has an electrohydraulic proportional control connected to the source of pilot fluid at least when the pilot valve device is directing pilot fluid to the directional valve. The electrohydraulic proportional control is operative to vary the flow rate to the directional valve responsive to receiving a command signal. A sensor mechanism is operative to sense a steer input to the pilot valve device and deliver the command signal to the electrohydraulic proportional control representative of the steer input command.

BRIEF DESCRIPTION OF THE DRAWING

The sole FIGURE is a diagrammatic schematic illustration of an embodiment of the present invention.

BEST MODE FOR CARRYING OUT THE INVENTION

An electrohydraulic steering system 10 is shown incorporated within an articulated machine 11 having a steer input mechanism 12 responsive to an operator input command and a pair of hydraulic steer cylinders 13 disposed to pivot a pair of frames 14,16 about a pivot 17. The steer input mechanism includes a steering wheel 18 rotatable in opposite directions to input pivotal movement to a steer input member 19.

The steering system includes a pilot valve device 21 connected to a source of pressurized pilot fluid such as a pilot pump 22 and to a three position pilot operated directional valve 23 connected to the steer cylinders 13. The directional valve is movable in opposite directions from a flow blocking off position shown to first and second discrete, fully open on positions.

The pilot valve device 21 includes a pair of two position on/off pilot valves 24,26 operative to direct pilot fluid from the pilot pump through a pair of pilot lines 27,28 to the opposite ends of the directional valve when the input member 19 is pivoted in response to a steer input command from the steering wheel 18.

A source of variable volume pressurized fluid 29 is connected to the directional valve 23 and has an electrohydraulic proportional control 31 connected to the pilot pump 22 at least when pressurized pilot fluid is being directed through one of the pilot lines 27,28 to actuate the directional valve to one of its on positions. The electrohydraulic proportional control is operative to vary the flow rate to the directional valve in response to receiving an electrical control signal. The source of variable volume pressurized fluid in this embodiment is a variable displacement pump having an electrohydraulic displacement controller 33 fluidly connected to a resolver 34 connected between the pilot lines 27,28.

A sensor mechanism 36 is operative to sense a steer input command to the pilot valve device 21 and deliver the control signal to the electrohydraulic control representative of the steer input command. The sensor mechanism includes a position sensor 37 disposed to output a command signal 38 to a controller 39 when the input member 19 is pivoted in either direction from the neutral position shown. The controller is operative to output a control signal 40 to the electrohydraulic proportional valve 33 commensurate with the steer input command from the steer operator mechanism 12.

Industrial Applicability

In use, clockwise articulation of the frames 14,16 about the pivot 17 is initiated by rotating the steering wheel 18 in the appropriate direction to cause clockwise movement of the input member 19. This moves the pilot valve 26 downwardly to direct pressurized pilot fluid through the pilot line 28 for moving the directional valve 23 rightward to communicate the pump 32 with the appropriate ends of the steer cylinders 13. The pivotal movement of the input member 19 is sensed by the position sensor 37 which directs the electrical command signal 38 to the controller 39 representative of the steer input command. The controller 39 converts the command signal to an appropriate control signal 40 and outputs the control signal to the displacement controller 33 for changing the displacement of the pump 32 so that the flow rate to the cylinders is commensurate with the pivotal position of the input member 19. Once the desired articulation angle is obtained, the steering wheel 18 is rotated in the opposite direction to return the input member 19 to the position shown. This simultaneously allows the directional valve 23 to move to its centered position shown and interrupts the command signal to the controller 39, thereby allowing the pump 32 to destroke to its minimal displacement position. Counterclockwise articulation of the machine 11 is similarly achieved by rotating the steering wheel 18 in an opposite direction.

In view of the above, it is readily apparent that the structure of the present invention provides an improved electrohydraulic steering system having fast response with accurate tracking of the steer input command. This is accomplished by utilizing the fast response characteristics of an electronically controlled variable displacement pump for flow rate control and using the directional valve simply for controlling the direction of the fluid flow.

Other aspects, objects and advantages of this invention can be obtained from a study of the drawings, the disclosure and the appended claims.

I claim:

1. An electrohydraulic steering system for a machine having a steer input mechanism responsive to an operator input and a hydraulic steer cylinder, comprising:

a pilot operated directional valve connected to the steer cylinder and movable in opposite directions from a flow blocking off position to first and second discrete, fully open on positions;

a source of pressurized pilot fluid;

a pilot valve device connected to the source of pressurized pilot fluid and to the directional valve and being operative to direct pilot fluid to the directional valve responsive to a steer input command from the steer input mechanism;

a source of variable volume pressurized fluid connected to the directional valve and having an electrohydraulic proportional control connected to the source of pilot fluid at least when the pilot valve device is directing pilot fluid to the directional valve, the electrohydraulic proportional control being operative to vary the flow rate to the directional valve responsive to receiving an electrical control signal; and a sensor mechanism operative to sense a steer input command to the pilot valve device and deliver the control signal to the electrohydraulic proportional control representative of the steer input command from the steer input mechanism.

2. The steering system of claim 1 wherein the source of variable volume pressurized fluid includes a variable displacement pump having an electrohydraulic displacement controller.

3. The steering system of claim 2 wherein the pilot valve device includes a pair of pilot valves connected to the source of pilot fluid and a pair of pilot lines connecting the pilot valves to the directional valve.

4. The steering system of claim 3 including a resolver connected to the pilot lines and to the displacement controller.

5. The steering system of claim 4 wherein the sensor mechanism includes a position sensor operative to sense the steer input command from the steer input mechanism and deliver a command signal representative of the steer input command, and a controller operative to receive the command signal and deliver the electrical control signal to the displacement controller.

\* \* \* \* \*